United States Patent [19]

Glukhovsky et al.

[11] 4,410,365
[45] Oct. 18, 1983

[54] BINDER

[76] Inventors: Viktor D. Glukhovsky, bulvar Lenina, 10, kv. 31; Pavel V. Krivenko, ulitsa Milchakova, 3-a, kv. 81; Galina S. Rostovskaya, prospekt Vossoedinenia, 3-b, kv. 19; Vasily J. Timkovich, ulitsa Volynskaya, 11/14, kv. 117, all of Kiev; Vitaly L. Pankratov, ulitsa Letnaya, 18, korpus 3, kv. 73, Mytyschi, Moskovskaya oblast, all of U.S.S.R.

[21] Appl. No.: 296,939

[22] Filed: Aug. 28, 1981

[51] Int. Cl.$^3$ ............................................. C04B 19/04
[52] U.S. Cl. ....................................... 106/84; 106/97; 106/117
[58] Field of Search ........................... 106/117, 84, 97

[56] References Cited

U.S. PATENT DOCUMENTS 900,939 10/1908 Kuhl ..................................... 106/117
4,306,912 12/1981 Forss ................................... 106/117

OTHER PUBLICATIONS

Lea & Desch, The Chemistry of Cement and Concrete, Edward Arnold (Pub.) Ltd., London, 1956 (Sci. Lib, Ta 434 Li43) p. 402.

Primary Examiner—James Poer
Attorney, Agent, or Firm—Ladas & Parry

[57] ABSTRACT

A binder comprises granulated blast furnace slag, a compound of an alkali metal, and an additive selected from the group consisting from portland cement clinker sodium sulphate, potassium sulphate. The components are taken in the following ratio, % by weight:

| | |
|---|---|
| granulated blast furnace slag | 79 to 98.5 |
| compound of an alkali metal | 1 to 12 |
| additive selected from the group consisting from portland cement clinker, sodium sulphate, potassium sulphate | 0.5 to 9 |

3 Claims, No Drawings

BINDER

BACKGROUND OF THE INVENTION

1. Field of the Invention

The present invention relates to compositions of binders. Most advantageously the invention can be used for manufacturing concrete and reinforced concrete products.

It is well known that the properties and parameters of a binder determine the physical and chemical properties of concrete as well as the cost thereof. Therefore many attempts have been made to improve binder compositions.

2. Description of the Prior Art

Known in the art are binders comprising granulated slag and compounds of alkali metals.

For manufacturing said binders, use is made of granulated blast furnace slags and electrothermophosphoric slags having a specific surface of not more than 300 $m^2/kg$. Used as compounds of alkaline metals are carbonates, fluorides, hydroxides and, most widely, sodium silicates and potassium silicates which are soluble glasses.

Such binders are very active, and concrete stone based thereon possesses high corrosion resistance, cold resistance, water impermeability, heat resistance, air resistance, water resistance, adhesion to fillers, reinforcement etc. They solidify in the air and in water and possess high hydraulic properties (V. D. Gluhovsky et al. Shchelochnyie i shelochno-zemelnyie gidravlicheskie viazhushchie i betony, Kiev, Vyshcha shkola Publishers, pp. 103-104).

However, because of considerable variations of chemical, mineralogical and phase composition of slags the prior art binders gain strength slowly. Therefore said binders are not used as quick-hardening binders.

In addition, cement stone based on such binders in some cases possesses increased shrinking deformation and increased time of damping thereof as compared to portland cement stone.

There is also known in the art a binder disclosed in USSR Inventor's Certificate No 408,928 and comprising in % by weight:

| granulated blast furnace slag | 55.5 to 61.0 |
|---|---|
| soluble glass | 29.0 to 33.0 |
| portland cement | 10.0 to 11.0 |

To obtain the above binder, the granulated blast furnace slag is preliminarily grinded until the specific surface of the slag is 2,800 to 3,000 $cm^2/g$ and then mixed with the portland cement. Thereafter the obtained mixture is sealed by an alkali component. The alkali component is a solution of sodium (or potassium) glass having a modulus of 1.8 to 2.3 and a density of 1.3 to 1.35 $g/cm^3$ in an amount of 40 to 43% of the weight of dry components.

The tests of the prior art binder have shown that the activity thereof both at early stages of solidification and later is low. In addition, the prior art binder gains strength slowly. Thus, the compressive strength of the prior art binder in one day is 10.6 MPa, and in 28 days, 32.6 MPa.

This is due to the fact that the binder comprises portland cement which contains gypsum intensifying the solidification process. The gypsum reacts with the alkali component and neutralizes it, which results in the formation of salts. This reduces the content of the alkali component in the binder, which brings about a decrease in the activity and atmospheric durability thereof.

SUMMARY OF THE INVENTION

An object of the invention is to provide a binder possessing high operation properties due to an increase in the rate of strengthening and activity thereof.

The object set forth is attained by that there is provided a binder comprising a granulated blast furnace slag, a compound of an alkali metal and an additive, wherein, according to the invention, the additive is a portland cement clinker, or sodium sulphate, or potassium sulphate, the components being taken in the following ratio, % by weight:

| granulated blast furnace slag | 79 to 98.5 |
|---|---|
| compound of an alkali metal | 1 to 12 |
| portland cement clinker, or sodium sulphate, or potassium sulphate as the additive | 0.5 to 9 |

The invention makes it possible to improve the operation properties of the binder due to both an increase in the rate of strengthening and activity thereof.

The above effect is attained due to the optimum ratio between gel and crystals of low-basic compounds in the gel-and-crystalline structure being formed.

It is recommended that the binder comprise granulated blast furnace slag, carbonates or silicates, or hydroxides, or fluorides of sodium or potassium, and a portland cement clinker as an additive in the following ratio, % by weight:

| granulated blast furnace slag | 79 to 96 |
|---|---|
| carbonates or silicates, or hydroxides, or fluorides of sodium or potassium | 3 to 12 |
| portland cement clinker | 1 to 9 |

This modification of the binder provides for a high and stable strength during the whole period of solidification of the binder, durability and weather proofness thereof, and in addition allows the utilization of granulated slags of various basicity for producing a binder possessing said properties.

It is expedient that the binder comprise the granulated blast furnace slag, sodium silicate, and sodium sulphate or potassium sulphate as the additive in the following ratio of the components, % by weight:

| granulated blast furnace slag | 80 to 98.5 |
|---|---|
| sodium silicate | 1 to 10 |
| sodium sulphate or potassium sulphate | 0.5 to 1.0 |

Said modification of the binder allows for acceleration of the hydration process, which provides for a higher strength of the binder at early time of solidification.

Now the invention will be described by specific Examples thereof.

DETAILED DESCRIPTION OF THE INVENTION

EXAMPLE 1

The binder of the present invention comprises, % by weight:

| | |
|---|---|
| granulated blast furnace slag | 79 |
| compound of an alkali metal | 12 |
| additive | 9 |

The granulated blast furnace slag of the following composition was used, % by weight: $SiO_2$, 33.6; $Al_2O_3$, 15.85; $Fe_2O_3$, 2.45; CaO, 35.67; MgO, 8.90; $SO_3$, 1.34; MnO, 1.40.

90% $Na_2CO_3$ and 10% NaOH were used as the compound of an alkali metal, and portland cement clinker as the additive.

To produce the binder, the granulated blast furnace slag and portland cement clinker were grinded in a ball mill till the specific surface thereof was 3,160 cm$^2$/g. Then to the obtained mixture a solution containing 90% $Na_2CO_3$ and 10% NaOH were added.

The produced binder was tested to determine the bending strength and the compressive strength thereof in 1, 3, 7 and 28 days, the beinding strength and the compressive strength thereof after steaming, and shrinkage deformation thereof in 28 and 100 days.

The testing procedures are given below. The results of the tests are given in Table 1. For comparison purposes the Table represents the results of testing the binder disclosed in USSR inventor's Certificate No 408,928.

To determine the consistency of the cement solution (binder solution), sand taken in an amount of 1,500 g and having a size of 0.5 to 0.85 mm and a powder taken in an amount of 500 g and consisting of the granulated slag and the additive are mixed together. The blast furnance granulated slag and the additive are preliminarily dried until the residual moisture content thereof is 1% by mass and grinded to a specific surface thereof of 3,000 to 3,400 cm$^2$/g. The mixture is poured into a spherical cup preliminarily wiped with a moist cloth and stirred therein for 1 min.

In the centre of the mixture there is prepared a hollow for a solution of an alkali component to be poured therein at a temperature of 20±2° C. and in an amount of 150 g, the ratio between the quantity of the solution of the alkali component and the quantity of the cement (binder) being 0.3. Further hereinbelow this ratio will be represented as S/C=0.3. The obtained sand-and-cement mixture is held for 0.5 min and stirred for 1 min, whereupon it is poured into a cup of a stirrer and stirred therein for 2.5 min.

A conical mould having the dimensions of D=100 mm, d=70 mm and h=60 mm is placed in the centre of a 300 mm in dia. disk of a vibrating platform. Prior to the testing procedure the inner surface of the cone and the disc of the platform are wiped with a humid cloth.

After the stirring has been finished, the conical mould is filled with the mixture to a half height thereof, wherein the mixture is compacted by driving thereinto a rod of d=20 mm and l=150 to 180 mm 15 times. Then the cone is filled to an excess with the mixture which is compacted by driving thereinto a rod 10 times. Following the compaction the excess of the mixture is cut off with a knife level with the edge of the cone, whereupon the mould is taken off in a vertical direction.

The sand-and-cement mixture having a shape of a cone is shaken on the platform 30 times in 30±s, whereupon the lowest diameter of the cone is measured in two mutually perpendicular directions so as to determine the average value thereof. With S/C=0.3 the spread of the cone should be within the range of 106 to 115 mm.

If the spread of the cone is less than 106 mm, the amount of the solution of the alkali component is increased to obtain the spread of the cone within the range of 106 to 108 mm. If the spread of the cone is more than 115 mm, the amount of the solution of the alkali component is decreased to obtain the spread of the cone within the range of 113 to 115 mm.

The ratio between the amount of the alkali component and the amount of the cement (binder), obtained after the cone has spread to 106 to 115 mm, is accepted for further tests.

To determine the strength characteristics of the cements (binder), there are produced specimens having a size of 40×40×100 mm and made from the cement solution prepared as described above and having a consistency characterized by the spread of the cone within the range of 106 to 115 mm.

Prior to making the specimens, the inner surface of the moulds is slightly lubricated with machine oil. At least 3 specimens are made for each test.

The moulds for making specimens are rigidly secured onto the vibrating platform. The mold is filled with the solution approximately to 1 cm of its height, whereupon the mold is shaken. During first two minutes the mold is gradually filled with small portions of the solution. After 3 min the shaking is completed. The mold is taken off from the vibrating platform, the excess of the solution is cut off with a knife moistened with water, and the surface is levelled off.

Having thus been made, the specimens contained in the molds are held in a bath with a seal water for 24±2 hours. Thereafter the specimens are carefully removed from the molds and placed horizontally into baths with water so that they do not contact one another. The water should cover the specimens by not less than 2 cm. The temperature of the water should be 20±2° C. Then the specimens are taken out of the water, and not later than in one hour are tested to determine the bending strength and the compressive strength thereof.

The bending strength is determined by applying a bending load until a specimen is broken. The halves of the specimens obtained after bending strength testing are placed between two plates, the area of each plate being 25 cm$^2$, and the compressive strength is determined.

To determine the strength after steaming, there are again made specimens as described above. Then closed molds containing specimens are placed into a steaming chamber and held therein for 120±10 min at a temperature of 20±3° C., the heater being disconnected. The steaming process is carried out in accordance with the following conditions: gradual rising of temperature up to 85±50° C. for 180±10 min, holding the specimens at this temperature of 360±10 min, cooling the specimens for 120±10 min with the heater being disconnected. In 24±2 hr from the moment of production the specimens are removed from the molds, and the bending strength and the compressive strength thereof are determined.

To determine the shrinkage deformation, again specimens are prepared. In the centre of the butt-end walls of the mould there are made sockets to be filled up with plasticine. 5 to 6 in dia. balls are impressed thereinto. Further on, the production of the specimens proceeds similarly to that described above. In 48±2 hr, counting from the moment of production, the specimens are removed from the moulds and immediately immersed into water having a temperature of 20±2° C. for 5 days.

Thereafter the specimens are placed into an exicator containing 200 g of dry $K_2CO_3$ and 150 ml of the supersaturated solution thereof. The specimens are held under the solution at the temperature of the air in the room being $20\pm2°$ C. Then the lengths of the specimens are measured by any conventional method to an accuracy of 0.01 mm and its variation is calculated relative to the length of the specimen of the age of 8 day.

EXAMPLE 2

The binder of the present invention comprises, % by weight:

| granulated blast furnace slag | 96 |
|---|---|
| compound of an alkali metal | 3 |
| additive | 1 |

The granulated blast furnace slag of the following composition was used, % by weight: $SiO_2$, 40.21; $Al_2O_3$, 5.38; $Fe_2O_3$, 0.47; CaO, 46.3; MgO, 4.50; $SO_3$, 0.56; MnO, 2.20.

Sodium metasilicate was used as the compound of an alkali metal, and portland cement clinker as the additive.

To produce the binder, the granulated blast furnace slag and portland cement clinker were grinded in a ball mill till the specific surface thereof was 3,000 $cm^2/g$. Then the obtained mixture was sealed by a solution of sodium metasilicate.

The produced binder was tested to determine the bending strength and the compressive strength thereof in 1, 3, 7 and 28 days, the bending strength and the compressive strength thereof after steaming, and the shrinkage deformation thereof in 28 and 100 days.

The tests were carried out in a manner similar to that described in Example 1. The results of the tests are given in Table 1.

EXAMPLE 3

The binder of the present invention comprises, % by weight:

| granulated blast furnace slag | 87 |
|---|---|
| compound of an alcali metal | 8 |
| additive | 5 |

The granulated blast furnace slag of the following composition was used, % by weight: $SiO_2$, 37.52; $Al_2O_3$, 9.50; $Fe_2O_3$, 2.2; CaO, 34.9; MgO, 11.25; $SO_3$, 0.66; MnO, 0.36.

90% $Na_2CO_3$ + 10% NaOH was used as the compound of an alkali metal, and portland cement clinker as the additive.

To produce the binder, the granulated blast furnace slag and portland cement clinker were grinded in a ball mill till the specific surface thereof was 3,120 $cm^2/g$. Then the obtained mixture was sealed by the mixture comprising 90% $Na_2CO_3$ + 10% NaOH.

The produced binder was tested to determine the bending strength and the compressive strength thereof in 1, 3, 7 and 28 days, the bending strength and the compressive strength thereof after steaming, and the shrinkage deformation thereof in 28 and 100 days.

The tests were carried out in a manner similar to that described in Example 1. The results of the tests are given in Table 1.

TABLE 1

| Indices 1 | The binder of the present invention | | | The binder disclosed in USSR Inventor's Certificate No 408928 5 |
|---|---|---|---|---|
| | Example 1 2 | Example 2 3 | Example 3 4 | |
| Compressive strength, MPa; | | | | |
| in 1 day | 15.2 | 46.8 | 31.4 | 13.6 |
| in 3 days | 26.4 | 64.1 | 51.5 | 19.5 |
| in 7 days | 49.4 | 73.0 | 56.6 | 21.8 |
| in 28 days | 89.6 | 102.4 | 81.2 | 30.1 |
| Compressive strength after steaming, MPa | 91.2 | 106.5 | 88.7 | 31.4 |
| Bending strength, MPa: | | | | |
| in 1 day | 2.2 | 6.2 | 4.9 | 1.4 |
| in 3 days | 2.3 | 6.3 | 6.2 | 2.0 |
| in 7 days | 3.9 | 6.8 | 7.8 | 2.3 |
| in 27 days | 8.4 | 9.8 | 8.9 | 3.7 |
| Bending strength after steaming, MPa | 9.1 | 9.3 | 8.9 | 3.8 |
| Shrinkage deformation, mm/m; | | | | |
| in 28 days | 0.5 | 0.61 | 0.81 | 1.2 |
| in 100 days | 1.38 | 1.41 | 1.5 | 2.45 |

EXAMPLE 4

The binder of the present invention comprises, % by weight:

| granulated blast furnace slag | 89 |
|---|---|
| compound of an alkali metal | 10 |
| additive | 1 |

The granulated blast furnace slag was of the following composition, % by weight: $SiO_2$, 35.71; $Al_2O_3$, 11.0; $Fe_2O_3$, 2.8; CaO, 43.35; MgO, 5.25; $SO_3$, 1.23; MnO, 0.49.

Sodium metasilicate was used as the compound of an alkali metal, and portland cement clinker as the additive.

To produce the binder, the granulated blast furnace slag and portland cement clinker were grinded in a ball mill till the specific surface thereof was 3,190 $cm^2/g$. Then to the obtained mixture a solution of sodium metasilicate was added.

The produced binder was treated to determine the bending strength and the compressive strength thereof in 1, 3, 7 and 28 days, the bending strength and the compressive strength thereof after steaming, and the shrinkage deformation thereof in 28 and 100 days.

The tests were carried out in a manner similar to that described in Example 1. The results of the tests are given in Table 2.

EXAMPLE 5

The binder of the present invention comprises, % by weight:

|  |  |
|---|---|
| granulated blast furnace slag | 98.5 |
| compound of an alkali metal | 1.0 |
| additive | 0.5 |

The granulated blast furnace slag was of the following composition, % by weight: $SiO_2$, 35.71; $Al_2O_3$, 11.00; $Fe_2O_3$, 2.8; CaO, 43.55; MgO, 5.28; $SO_3$, 1.23; MnO, 0.49.

Sodium metasilicate was used as the compound of an alkali metal, and portland cement clinker as the additive.

To produce the binder, the granulated blast furnace slag and sodium sulphate were grinded in a ball mill till the specific surface thereof was 3,270 cm²/g. Then the obtained mixture was sealed by a solution of sodium metasilicate.

The produced binder was tested to determine the bending strength and the compressive strength thereof in 1, 3, 7 and 28 days, the bending strength and the compressive strength thereof after steaming, and the shrinkage deformation thereof in 28 and 100 days.

The tests were carried out in a manner similar to that described in Example 1. The results of the tests are given in Table 2.

EXAMPLE 6

The binder of the invention comprises, % by weight:

|  |  |
|---|---|
| granulated blast furnace slag | 93.25 |
| compound of an alkali metal | 6.0 |
| additive | 0.75 |

The granulated blast furnace slag was of the following composition, % by weight: $SiO_2$, 36.39; $Al_2O_3$, 6.75; $Fe_2O_3$; 2.6; CaO, 45.85; MgO, 2.94; $SO_3$, 2.61; MnO, 1.63.

Sodium metasilicate was used as the compound of an alkali metal, and sodium sulphate as the additive.

To produce the binder, the granulated blast furnace slag and sodium sulphate were grinded in a ball mill till the specific surface thereof was 3,310 cm²/g. Then the obtained mixture was sealed by a solution of sodium metasilicate.

The produced binder was tested to determine the bending strength and the compressive strength thereof in 1, 3, 7 and 28 days, the bending strength and the compressive strength thereof after steaming, and the shrinkage deformation thereof in 28 and 100 days.

The tests were carried out in a manner similar to that described in Example 1. The results of the tests are given in Table 2.

TABLE 2

| Indices | Example 4 | Example 5 | Example 6 |
|---|---|---|---|
| Compressive strength, MPa: |  |  |  |
| in 1 day | 33.5 | 32.1 | 30.2 |
| in 3 days | 69.0 | 60.5 | 58.7 |
| in 7 days | 83.4 | 69.0 | 68.1 |
| in 28 days | 115.0 | 104.0 | 90.7 |
| Compressive strength after steaming, MPa | 111.3 | 106.2 | 91.4 |
| Bending strength, MPa: |  |  |  |
| in 1 day | 5.5 | 4.9 | 4.0 |
| in 3 days | 5.8 | 5.2 | 4.8 |
| in 7 days | 6.1 | 6.3 | 6.2 |
| in 28 days | 11.4 | 11.2 | 7.4 |
| Bending strength after steaming, MPa | 11.5 | 11.6 | 8.2 |
| Shrinkage deformation, mm/m: |  |  |  |
| in 28 days | 0.71 | 0.80 | 0.76 |
| in 100 days | 1.40 | 1.49 | 1.42 |

Example 7 (negative)
A binder comprises, % by weight:

|  |  |
|---|---|
| granulated blast furnace slag | 80 |
| compound of an alkali metal | 10 |
| additive | 10 |

The granulated blast furnace slag was of the following composition, % by weight: $SiO_2$, 33.6; $Al_2O_3$, 15.85; $Fe_2O_3$, 2.45; CaO, 35.67; MgO, 8.90; $SO_3$, 1.34; MnO, 1.40.

The compound of an alkali metal was sodium metasilicate, and the additive was portland cement clinker.

To produce the binder, the granulated blast furnace slag and the portland cement clinker were grinded in a ball mill till the specific surface thereof was 3,400 cm²/g. Then to the obtained mixture a solution of sodium metasilicate was added.

Thus produced binder was tested to determine the bending strength and the compressive strength thereof in 1, 3, 7 and 28 days, the bending strength and the compressive strength thereof after steaming, and the shrinkage deformation thereof in 28 and 100 days.

The binder was tested in accordance with the testing procedures described in Example 1. The obtained results were as follows:

| Compressive strength, MPa: |  |
|---|---|
| in 1 day | 15.0 |
| in 3 days | 24.0 |
| in 7 days | 45.0 |
| in 28 days | 60.7 |
| Compressive strength after steaming, MPa | 62.0 |
| Bending strength, MPa: |  |
| in 1 day | 1.8 |
| in 3 days | 2.0 |
| in 7 days | 2.8 |
| in 28 days | 4.2 |
| Bending strength after steaming, MPa | 4.2 |
| Shrinkage deformation, mm/m: |  |
| in 28 days | 0.9 |
| in 100 days | 1.3 |

Thus, if the amount of the additive contained in the binder is greater than that indicated in the claims, both the bending strength and the compressive strength of the binder are reduced.

EXAMPLE 8 (negative)

A binder comprises, % by weight:

|  |  |
|---|---|
| granulated blast furnace slag | 97.1 |
| compound of an alkali metal | 2 |
| additive | 0.9 |

The granulated blast furnace slag was of the following composition, % by weight: $SiO_2$, 33.6; $Al_2O_3$, 15.85; $Fe_2O_3$, 2,45; CaO, 35.67; MgO, 8.90; $SO_3$, 1.34; MnO, 1.40.

The compound of an alkali metal was sodium metasilicate, and the additive was portland cement clinker.

To produce the binder, the granulated blast furnace slag and the portland cement clinker were grinded in a ball mill till the specific surface thereof was 3,390 cm²/g. Then the obtained mixture was sealed a solution of sodium metasilicate.

Thus produced binder was tested to determine the bending strength and the compressive strength thereof in 1, 3, 7 and 28 days, the bending strength and the compressive strength thereof after steaming, and the shrinkage deformation thereof in 28 and 100 days.

The binder was tested in accordance with the testing procedures described in Example 1. The obtained results were as follows:

| | |
|---|---|
| Compressive strength, MPa: | |
| in 1 day | 9.3 |
| in 3 days | 19.8 |
| in 7 days | 30.0 |
| in 28 days | 63.6 |
| Compressive strength after steaming, MPa | 64.0 |
| Bending strength, MPa: | |
| in 1 day | 1.6 |
| in 3 days | 2.0 |
| in 7 days | 2.3 |
| in 28 days | 5.6 |
| Bending strength after steaming, MPa | 5.7 |
| Shrinkage deformation, mm/m: | |
| in 28 days | 0.9 |
| in 100 days | 1.53 |

Thus the decrease in the content of the additive in the binder by lower than indicated in the claims causes a considerable decrease in both the bending and compressive strength thereof.

EXAMPLE 9 (negative)

A binder comprises, % by weight:

| | |
|---|---|
| granulated blast furnace slag | 98.7 |
| compound of an alkali metal | 0.9 |
| additive | 0.4 |

The granulated blast furnace slag was of the following composition, % by weight: $SiO_2$, 33.6; $Al_2O_3$, 15.85; $Fe_2O_3$, 2.45; CaO, 35.67; MgO, 8.9; $SO_3$, 1.34; MnO, 1.4.

The compound of an alkali metal was sodium metasilicate, and the additive was potassium sulphate.

To produce the binder, the granulated blast furnace slag and potassium sulphate were grinded in a ball mill till the specific surface thereof was 3,320 cm²/g. Then the obtained mixture was sealed by a solution of sodium metasilicate.

Thus produced binder was tested to determine the bending strength and the compressive strength thereof in 1, 3, 7 and 28 days, the bending strength and the compressive strength thereof after steaming, and the shrinkage deformation thereof in 28 and 100 days.

The binder was tested in accordance with the testing procedures described in Example 1. The obtained results were as follows:

| | |
|---|---|
| Compressive strength, MPa: | |
| in 1 day | 8.1 |
| in 3 days | 9.4 |
| in 7 days | 21.2 |
| in 28 days | 49.0 |
| Compressive strength after steaming, MPa | 49.8 |
| Bending strength, MPa: | |
| in 1 day | 1.0 |
| in 3 days | 1.7 |
| in 7 days | 2.1 |
| in 28 days | 4.9 |
| Bending strength after steaming, MPa | 5.1 |
| Shrinkage deformation, mm/m: | |
| in 28 days | 1.1 |
| in 100 days | 2.1 |

The above ratio of the components of the binder causes a considerable decrease in the bending strength and the compressive strength of the binder and an increase in the shrinkage deformation thereof.

While particular embodiments of the invention have been shown and described, various modifications thereof will be apparent to those skilled in the art and therefore it is not intended that the invention be limited to the disclosed embodiments and the departures may be made therefrom within the spirit and scope of the invention as defined in the claims.

What we claim is:

1. A binder consisting essentially of granulated blast furnace slag, a compound of an alkali metal selected from those compounds which give an alkaline reaction in an aqueous medium and an additive selected from the group consisting of portland cement clinker, sodium sulphate and potassium sulphate in the ratio of the components being the following % by weight:

| | |
|---|---|
| granulated blast furnace slag | 79 to 98.5 |
| compound of an alkali metal selected from those compounds which give an alkaline reaction in an aqueous medium | 1 to 12 |
| additive selected from the group consisting of portland cement clinker, sodium sulphate and potassium sulphate. | 0.5 to 9 |

2. A binder as claimed in claim 1, consisting essentially of granulated blast furnace slag, inorganic salt which gives an alkaline reaction in an aqueous medium and selected from the group consisting of carbonates, silicates, hydroxides, fluorides of sodium or potassium, as said alkaline metal compound and portland cement clinker as said additive, in the following ratio of the components, % by weight:

| | |
|---|---|
| granulated blast furnace slag | 79 to 96 |
| inorganic salts which give an alkaline reaction in an aqueous medium and is selected from the group consisting of carbonates silicates, hydroxides, fluorides of alkali metals selected from the group consisting of sodium potassium | 3 to 12 |
| portland cement clinker | 1 to 9 |

3. A binder as claimed in claim 1, consisting essentially of granulated blast furnace slag, sodium silicate and, as said additive, sulphate of an alkali metal selected from the group consisting of sodium and potassium, the components being taken in the following % by weight:

| | |
|---|---|
| granulated blast furnace slag | 89 to 98.5 |
| sodium silicate giving alkaline reaction in aqueous medium | .1 to 10 |
| sulphate of an alkali metal selected from the group consisting of sodium and and potassium | 0.5 to 1.0 |

* * * * *